May 28, 1935.  M. SCHMIERER  2,002,551
GLOW DISCHARGE DEVICE
Filed Aug. 12, 1929
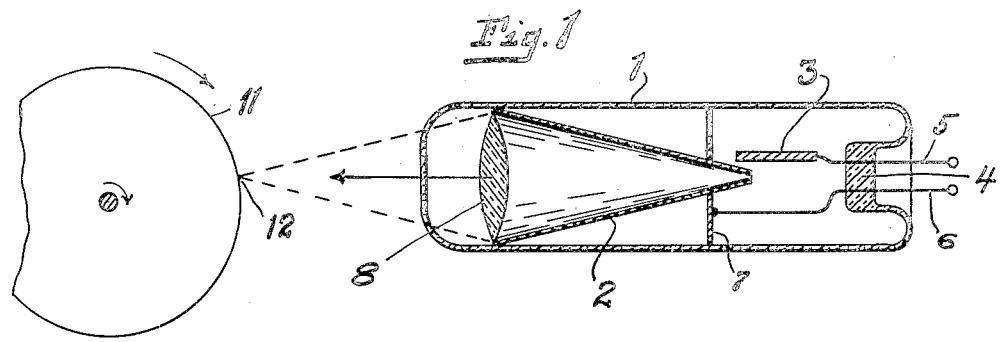
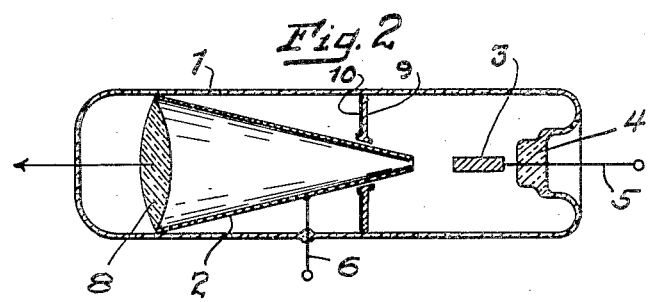
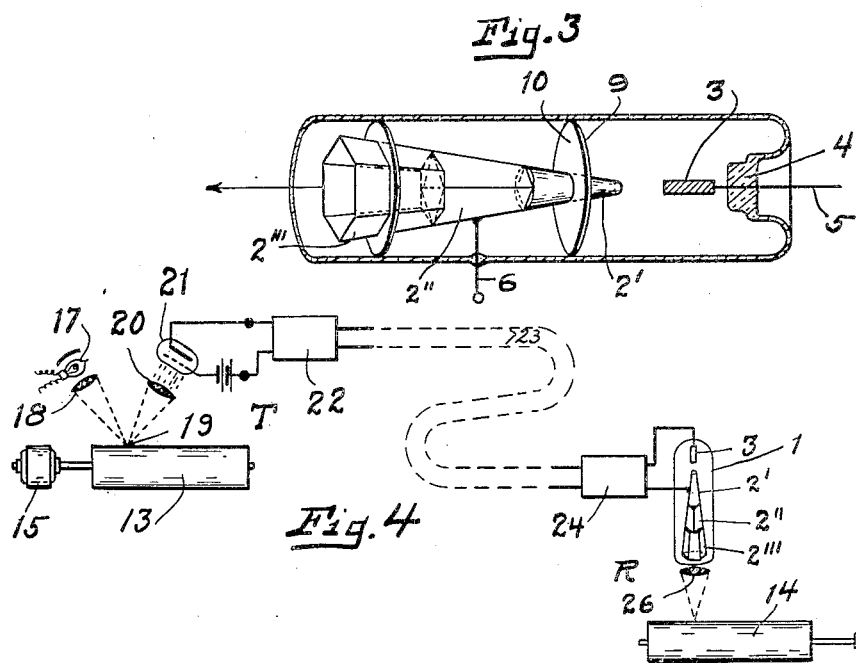
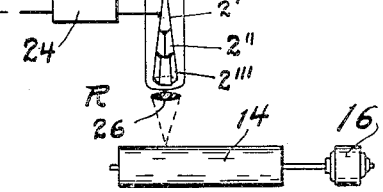
INVENTOR
Michael Schmierer
BY Samuel Ostrolenk
ATTORNEY Patented May 28, 1935

2,002,551

UNITED STATES PATENT OFFICE 2,002,551

GLOW DISCHARGE DEVICE

Michael Schmierer, Berlin, Germany

Application August 12, 1929, Serial No. 385,314
In Germany August 18, 1928

6 Claims. (Cl. 176—122)

This invention refers to glow discharge devices and is especially directed to glow discharge tubes which are used for producing light variations in accordance with variations of electrical input currents such as is for instance used in picture transmission systems or in the manufacture of talking films and the like. As is well known, the glow lamps being filled with an inert gas at reduced pressure, such as for instance, neon, are extensively used for this purpose. Such a device in its simplest embodiment consists of two electrodes arranged within a tube of rarefied gas, such as neon evacuated to such a point that the negative or so-called cathode glow is present. The brightness of this glow is very sensitive to current changes, a fact which makes this kind of tube especially adaptable to the purpose above mentioned. The light changes follow so rapidly the variations of electrical voltage or currents applied to the electrodes of the tube, that this kind of tube is now used satisfactorily for television purposes.

In many practical instances such as in picture transmission over long distances, the electrical currents available for the operation of the glow lamp are very small and have to be amplified considerably to an amount for effectively controlling the operation of the tube. It is obvious that such amplification should be kept as low as possible as it is very liable to introduce further disadvantages such as distortion aside from the fact that it complicates the receiving apparatus and increases the expense.

It is one object of this invention to provide a glow discharge device which increases the amount of light variations for a given intensity of input energy as compared with glow lamps of the type heretofore used. Accordingly, this object of the invention consists in providing means in connection with a glow discharge device for concentrating the glowing space to a small spot which may be readily collected by an optical lens system. In this way, all the light produced by the glow discharge, dependent on the electrical input energy, may be utilized and no considerable amount of light is lost as in the usual glow lamps by side irradiation. In this way, the efficiency of a normal glow discharge device is increased considerably.

As is well known, half-tone pictures as reproduced by the usual photoelectric reproducing systems, cannot be directly reproduced by a printing method and have first to be divided by a line screen so as to produce a printing block which may be used after the known half-tone method. Such half-tone picture consists, as is generally known, of large and small points scattered in a chess-board manner over the surface of the picture. By the different size of these points or specks, the various shades of the picture are produced. The larger the size at one part of the picture, the darker this part will appear if the picture is observed at a sufficient distance so that the individual points can no more be distinguished.

For practical reasons, it is impossible to divide a picture which has once been divided up into surface elements, such as is the case in picture transmission, a second time through a screen if the latter is not so thin that a large number of points comes on each of said surface elements. It therefore appears advisable, in accordance with this invention, to produce pictures transmitted directly in a half-tone manner so that they may be applied onto a zinc plate without need of a screen. This constitutes one of the further main objects of this invention which consists in providing a glow discharge device in which the glow takes place in a concentrated spot varying its size in accordance with the intensity of the operating currents applied to the device.

It is of course obvious that such a system is applicable to many purposes besides picture transmission, as mentioned, and may be used as a screening apparatus for transforming evenly shaded pictures like the usual photographs into half-tone pictures without the use of a screen.

This and further objects of my invention will become clear by the following detailed description together with the accompanying drawing which form a part of this specification and which illustrate in a diagrammatic fashion certain structural arrangements in which the invention may be embodied or availed of, but it is to be understood that these are presented for purpose of illustration only and not to be accorded any interpretation having the effect of limiting the appended claims short of the true and comprehensive scope of my invention.

Figure 1 illustrates one form of glow discharge device embodying my invention.

Figure 2 is a glow discharge tube similar to that of Fig. 1 and

Figure 3 is another modification of the tube of Fig. 1 for the purpose of reproducing half-tone pictures.

Figure 4 shows a complete system in schematic form of a facsimile transmission apparatus for direct reproduction of a half-tone picture, in accordance with my invention.

With the above objects in view, my invention broadly consists in providing in connection with a glow discharge tube, a cathode for this tube in which the glowing surface is formed as an oblong body by suitably dimensioning the cathode, whereby the direction of vision is in the direction of the lengthwise axis of such cathode. In case that this body is of cone or pyramid shape, a projection of the glowing surface upon a plane at right angle to the axis is a small speck whose size varies in accordance with the intensity of the current applied to the tube. An explanation of this phenomenon may easily be given as follows:—

The voltage applied to the electrodes of the tube will produce a glow discharge at the cathode, which covers a surface which will be the greater the higher the voltage applied. As the increased portions of the glow cathode from the apex towards its base have larger diameters on account of the conical or pyramidical shape chosen, it is evident that the size of the glowing spot will increase with the glowing surface, or, in other words, will increase with the current or voltage which is applied to the tube. In case that the shape of the cathode is that of a cylinder or prism, the light speck appears unvaried in its dimensions but its brightness will then change in accordance with the intensity of the operating currents. There exists an essential difference as compared to the well known oscilloscope in which the glowing surface is also rolled up to form a cylinder whose axis however is at right angle to the direction of vision. Preferably, I provide a cathode of this novel type in the form of a hollow body whereby means are provided to produce an electric glow discharge at the inside surface of this body. In this way, it is possible to decrease the diameter of the smallest light speck to less than one millimeter whereas with a solid body with an outside glowing surface, the smallest light speck has the shape of a ring and is considerably larger than this value. Besides this, the anode may be arranged more easily within the tube, that is, outside the path of the light rays produced by the glow discharge whereby no objectionable shadow will be produced. In case that the glow lamp is destined for receiving pictures electrically transmitted which are directly to be recorded as screened half-tone pictures, it is preferable in accordance with my invention, to provide means by which the light spot as long as it is small, possesses a circular shape, whereas with its size increasing, it assumes quadrangular shape and finally, it will assume a hexagonal shape or the shape of a quadrangle with cut off edges. This, as will be seen from the illustration of the drawing, may be carried out easily in accordance with the novel features of the invention.

Referring to Figure 1 of the drawing, a vessel or envelope is filled, in accordance with the known art, with a gas preferably of the inert group, such as neon, helion or the like or with an appropriate mixture of such gases and contains a cathode 2 in the illustration shown having the form of a hollow cone with an opening at its apex; an anode electrode 3 is arranged opposite and outside the hollow cathode on a press 4 in connection with the insulating tube through which lead connecting wires 5 and 6 to the anode and cathode respectively.

A supporting member 7 in the embodiment shown, having the shape of a ring, holds the cathode in proper position. This supporting member 7 at the same time serves for connecting the cathode with the outside lead 6. Numeral 8 represents schematically an optical lens system which of course need not be arranged inside the tube, but may be mounted in any convenient manner outside the tube. By applying to the outside surface of the conical cathode 2, a layer of insulating material such as lacquer, the cathode glow will take place at the inside of the cathode and will appear to one looking in the direction towards the apex of the cathode, as a small spot which, by means of the lens system 8 will be directed to a corresponding spot on the drum 11 which may for instance be the receiving drum of the picture receiving installation.

Referring to Figure 2 of the drawing, the supporting member 7 is replaced by a member 9 to which is applied a layer 10 of insulating material such as lacquer so as to prevent the production of a glow discharge on the outside surface of the cathode. Furthermore, lead 6 for the cathode is arranged in a different compartment of the tube from the compartment in which the anode is arranged, both compartments being formed by the supporting member 9. In this manner, no direct objectionable discharge between the anode and cathode leads takes place.

Figure 3 of the drawing shows a tube in accordance with my invention in its preferred embodiment for recording half-tone pictures. In accordance with this embodiment of a glow discharge recording tube, the cathode 2 is made of three individual portions, 2', 2'', 2''', the first one at the apex having a circular cross-section for recording small spots in accordance with small input currents; the second portion having a quadrangular cross-section for recording spots of medium size in accordance with input currents of medium intensity, and the third portion at the base of the cathode having a hexagonal cross-section for recording large spots of light in accordance with input currents of high intensity.

As pointed out above, the glowing surface will increase with the increase of current from the apex of the glow cathode and, as it is readily seen, that with a cathode of the type shown by Figure 4 with properly chosen proportions and designs, small currents will produce a circular spot on the reproducing sheet, whereas medium currents will produce a rectangular shaped spot and larger currents will assume a hexagonal shape, such as in accordance with the preferred established practice in half-tone reproduction.

Figure 4 represents a complete picture transmission system comprising a transmitter T and a receiver R connected by any of the well-known means, such as through a line wire or a wireless transmission channel indicated schematically by the reference numeral 23. Each station comprises a cylinder 13 and 14 respectively, of the well-known type used for scanning and reproducing a picture. These cylinders are driven by motors 15, 16 respectively in synchronism and simultaneously moved lengthwise to their axis in a manner well known in the art so that the picture on the transmitting side and the reproduction sheet on the receiving side is synchronously scanned and recorded along a helical trace. No means for synchronization has been shown in the drawing as this is outside of the scope of the present invention. The scanning of the picture or document applied to the transmitting cylinder 13 is carried out by means of a source of light 17, concentrating a small spot upon the cylinder 13 by means of the lens 18. The amount of reflected light which is a measure of the tone value of the picture element 19 under scanning, is collected by a further lens 17 and utilized to operate photoelectric cell 20 of any well known type, which in its output produces electrical currents of varying intensity in accordance with the successively scanned elementary picture portions of the picture. 22 represents schematically a transmitting apparatus which may comprise the usual amplifiers, modulators and in case of a wireless transmission, the necessary means for radiation such as an aerial. 24 on the receiving side schematically represents a receiver of the well-known type for receiving directly or thru space the currents transmitted from the transmitter and which may comprise the usual amplifying and demodulation devices. The output of this receiver 24 will then deliver electrical currents having an intensity varying in accordance with the currents produced in the electro cell and the transmitter. These currents are applied to the electrodes 2 and 3 of a glow discharge tube 25 of the type more particularly illustrated by Figure 4. As will be seen, the glowing surface produced by the cathode of this tube and projected by means of a lens 26 upon the receiving sheet applied to the receiving cylinder 14, will vary from circular to rectangular to a hexagonal shape, depending on whether a light or medium or dark spot 19 is under scanning at the transmitting side. Thus, a half-tone picture which may be used for direct reproduction without any further intermediary process is obtained. It is obvious that a system as shown by Fig. 4 need not necessarily be a transmission system for pictures or documents from one point to a distant point, but the apparatus of stations T and R may be directly combined, such as by arranging the drums 13 and 14 on a common axis driven by a common motor to secure synchronism. In this case, the apparatus may be used for transforming a gradually shaded picture such as is obtained in ordinary photography into a screen half-tone picture without using a screen. As is well known, the production of half-tone pictures by means of a screen is a very complicated and difficult process which requires the skill of the operator, whereas when using an apparatus as just described, the production of a halftone picture is greatly simplified.

I claim:

1. In an electric glow lamp for producing light spots of different size and configuration in accordance with input currents of varying intensity, comprising a glass tube filled with an inert gas at reduced pressure, a hollow cathode in said tube of tapering shape with an opening at its apex and having successive variations of its cross-section configuration, an anode arranged outside of said cathode and means to produce electric discharge glow on the inside surface of said cathode, with the direction of vision being in the direction of the longitudinal axis of said cathode.

2. In an electric glow lamp for producing light spots of different size and configuration in accordance with input currents of varying intensity, comprising a glass tube filled with neon gas at reduced pressure, a hollow cathode in said tube of tapering shape with an opening at its apex and having successive variations of its cross-section configuration, an anode arranged outside of said cathode and means to produce electric discharge glow on the inside surface of said cathode.

3. In an electric glow lamp for producing light spots of different size and configuration for electrically recording half-tone pictures comprising a glass tube filled with an inert gas at low pressure, a hollow cathode in said tube of tapering shape with an opening at its apex and having a circular cross-section at its upper portion, a triangular cross-section at its middle portion and a hexagonal cross-section at its base, an anode arranged outside of said cathode and means to produce a discharge glow on the inside surface of said cathode.

4. An electric glow discharge device comprising an envelope, a gaseous atmosphere therein, a hollow cathode of tapering shape, and a cooperating anode disposed within said vessel, said cathode having successive variations of its cross-section configuration.

5. A negative glow discharge device comprising an envelope, an inert gaseous atmosphere therein, a hollow cathode therein of tapering shape having an opening at its apex and having successive variations of its cross-section configuration, a cooperating anode electrode arranged outside said cathode, and means to produce an electric glow on the inside surface of said cathode.

6. A negative glow discharge device comprising an envelope, an inert gaseous atmosphere therein, a hollow cathode within said envelope of tapering shape and having successive variations of its cross-section configuration, an anode arranged outside of said cathode, and means to produce a negative glow discharge on the inside surface of said cathode.

MICHAEL SCHMIERER.